(12) United States Patent
Zhu

(10) Patent No.: US 11,497,044 B2
(45) Date of Patent: Nov. 8, 2022

(54) METHOD AND DEVICE FOR DETECTING SCHEDULING SIGNALING

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 220 days.

(21) Appl. No.: 16/624,094

(22) PCT Filed: Jun. 20, 2017

(86) PCT No.: PCT/CN2017/089205
§ 371 (c)(1),
(2) Date: Dec. 18, 2019

(87) PCT Pub. No.: WO2018/232601
PCT Pub. Date: Dec. 27, 2018

(65) Prior Publication Data
US 2020/0154464 A1 May 14, 2020

(51) Int. Cl.
*H04W 72/12* (2009.01)
*H04W 72/04* (2009.01)

(52) U.S. Cl.
CPC ..... *H04W 72/1273* (2013.01); *H04W 72/042* (2013.01); *H04W 72/0446* (2013.01); *H04W 72/0466* (2013.01)

(58) Field of Classification Search
CPC ........... H04W 72/1273; H04W 72/042; H04W 72/0446; H04W 72/0466; H04W 72/1289; Y02D 30/70; H04L 5/0053
See application file for complete search history.

(56) References Cited

U.S. PATENT DOCUMENTS 10,271,321 B1* 4/2019 Patel ..................... H04L 1/0046
2010/0272041 A1 10/2010 Ramakrishna
(Continued)

FOREIGN PATENT DOCUMENTS

| CN | 101287281 A | 10/2008 |
|----|-------------|---------|
| CN | 101478828 A | 7/2009 |

(Continued)

OTHER PUBLICATIONS

Supplementary European Search Report in Application No. EP17914887, dated May 4, 2020.
(Continued)

*Primary Examiner* — Hoang-Chuong Q Vu
(74) *Attorney, Agent, or Firm* — Syncoda LLC; Feng Ma

(57) ABSTRACT

A method for detecting scheduling signaling includes: sending target information to a terminal, the target information being used for determining, when scheduling signaling detection is performed on each downlink time domain unit by the terminal, whether a condition under which scheduling signaling detection on the current downlink time domain unit is stopped is satisfied In the process in which a base station performs dynamic scheduling on a terminal, the detection complexity of the terminal can be reduced, the power consumption of the terminal can also be lowered, and the power of the terminal can be saved.

15 Claims, 11 Drawing Sheets

(56) References Cited

U.S. PATENT DOCUMENTS

| | | | | |
|---|---|---|---|---|
| 2010/0302983 A1* | 12/2010 | McBeath | ............ | H04L 27/2647 |
| | | | | 370/311 |
| 2012/0113914 A1* | 5/2012 | Zhao | .................... | H04L 5/0007 |
| | | | | 370/329 |
| 2012/0190377 A1* | 7/2012 | Li | ........................ | H04L 1/0061 |
| | | | | 455/452.1 |
| 2013/0039291 A1* | 2/2013 | Blankenship | ....... | H04W 72/042 |
| | | | | 370/329 |
| 2016/0081098 A1 | 3/2016 | Wu et al. | | |
| 2018/0192402 A1* | 7/2018 | Shelby | .................. | H04L 1/0072 |
| 2019/0124631 A1* | 4/2019 | Ren | .................... | H04W 72/042 |

FOREIGN PATENT DOCUMENTS

| | | |
|---|---|---|
| CN | 102246449 A | 11/2011 |
| CN | 102804670 A | 11/2012 |
| CN | 103002477 A | 3/2013 |
| CN | 102217404 B | 6/2015 |
| CN | 105764146 A | 7/2016 |
| CN | 106603210 A | 4/2017 |
| KR | 20140003956 A | 1/2014 |
| WO | 2016055472 A1 | 4/2016 |

OTHER PUBLICATIONS

International Search Report in International application No. PCT/CN2017/089205, dated Mar. 16, 2018.
India 1st Office Action in Application No. 201927051072, dated Feb. 26, 2021.
GN First Office Action in Application No. 201780000485.6, dated Jul. 26, 2021.

\* cited by examiner

METHOD AND DEVICE FOR DETECTING SCHEDULING SIGNALING

CROSS-REFERENCE TO RELATED APPLICATION

This application is a national stage of International Application No. PCT/CN2017/089205 filed on Jun. 20, 2017, the disclosure of which is hereby incorporated by reference in its entirety.

TECHNICAL FIELD

The present disclosure relates to the field of communications technologies, and more particularly, to a method and a device for detecting a scheduling signaling.

BACKGROUND

In an LTE (Long-Term Evolution) system, during a process in which the base station performs the dynamic scheduling on the terminal, the terminal can detect scheduling signalings for itself on each downlink time domain unit. The number of detections supported by the terminal on each downlink time domain unit affects detection performance of the scheduling signalings and detection complexity of the terminal. The more the number of detections, the better the detection performance of the scheduling signalings, but the detection complexity and power consumption of the corresponding terminal will increase accordingly.

In a new generation of communication systems, control regions which is required to be detected by the terminal may be increased significantly, which will bring significant detection complexity to the terminal and cause greater power consumption.

SUMMARY

To overcome problems in the related art, embodiments of the present disclosure provide a method and a device for detecting a scheduling signaling.

According to a first aspect of the embodiments of the present disclosure, there is provided a method for detecting a scheduling signaling, where the method is applicable a base station, and the method includes:

sending target information to a terminal, wherein the target information is configured to, when scheduling signaling detection is performed on each downlink time domain unit by the terminal, determine whether a condition for stopping the scheduling signaling detection on a current downlink time domain unit is satisfied.

Optionally, the target information includes any one of the following:

a maximum of an amount of the scheduling signalings transmitted on each downlink time domain unit;

detection indication information configured to indicate whether to stop scheduling signaling detection; and feature information configured to characterize whether to stop scheduling signaling detection.

Optionally, when the target information includes the maximum of the amount of the scheduling signalings transmitted on each downlink time domain unit, sending target information to the terminal includes:

sending the target information to the terminal through a first target signaling or a second target signaling;

wherein, the first target signaling is a signaling sent to the terminal before sending the scheduling signaling; the second target signaling is a signaling that belongs to a same downlink time domain unit as the scheduling signaling.

Optionally, the first target signaling includes any one of the following:

a radio resource control signaling, system information, a media access control address control unit, and a physical layer signaling;

the second target signaling includes any one of the following:

a common scheduling signaling for transmitting public information, an exclusive scheduling signaling corresponding only to the terminal, and a predefined signaling not belonging to the scheduling signaling.

Optionally, the detection indication information includes:

a first detection indication information configured to indicate continuing the scheduling signaling detection, and a second detection indication information configured to indicate stopping the scheduling signaling detection; or a third detection indication information configured to indicate the currently remaining amount of scheduling signalings to be detected.

Optionally, when the target information includes the detection indication information, sending target information to the terminal includes:

sending scheduling signaling carrying the target information to the terminal.

Optionally, the target information is located at a preset position of the scheduling signaling, and a length of the target information is a preset length.

Optionally, the feature information includes:

a first preset scrambling sequence and a second preset scrambling sequence for scrambling downlink control information;

wherein, the first preset scrambling sequence is configured to indicate continuing the scheduling signaling detection, and the second preset scrambling sequence is configured to indicate stopping the scheduling signaling detection.

Optionally, if the target information includes the feature information, sending target information to the terminal includes:

scrambling the scheduling signaling through the target information, and sending the scrambled scheduling signaling to the terminal.

According to a second aspect of the embodiments of the present disclosure, there is provided a method for detecting a scheduling signaling, wherein the method is applicable to a terminal, and the method includes:

receiving target information sent by a base station; wherein the target information is configured to determine whether a condition for stopping scheduling signaling detection on a current downlink time domain unit is satisfied, when the scheduling signaling detection is performed by the terminal on each downlink time domain unit, when the scheduling signaling detection is performed on each downlink time domain unit, if it is determined that the condition for stopping the scheduling signaling detection is satisfied according to the target information, stopping the scheduling signaling detection on the current downlink time domain unit.

Optionally, the target information includes any one of the following:

a maximum of an amount of the scheduling signalings transmitted on each downlink time domain unit;

detection indication information configured to indicate whether to stop scheduling signaling detection; and feature information configured to characterize whether to stop scheduling signaling detection.

Optionally, the detection indication information includes:

a first detection indication information configured to indicate continuing the scheduling signaling detection, and a second detection indication information configured to indicate stopping the scheduling signaling detection; or a third detection indication information configured to indicate currently remaining amount of scheduling signalings to be detected.

Optionally, the feature information includes:

a first preset scrambling sequence and a second preset scrambling sequence configured to scramble downlink control information;

wherein, the first preset scrambling sequence is configured to indicate continuing the scheduling signaling detection, and the second preset scrambling sequence is configured to indicate stopping the scheduling signaling detection.

Optionally, determining whether the condition for stopping scheduling signaling detection according to the target information is satisfied includes any one of the following:

determining whether the amount of the scheduling signalings that have been detected on the current downlink time domain unit reaches the maximum, and if the amount of the scheduling signalings that have been detected on the current downlink time domain unit reaches the maximum, determining that the condition for stopping the scheduling signaling detection is satisfied;

if the second detection indication information is detected on the current downlink time domain unit, determining that the condition for stopping the scheduling signaling detection is satisfied;

if the third detection indication information is detected on the current downlink time domain unit, and the currently remaining amount of the scheduling signalings to be detected indicated by the third detection indication information is zero, determining that the condition for stopping the scheduling signaling detection is satisfied;

when the scheduling signaling is descrambled on the current downlink time domain unit, if the scheduling signaling is descrambled through the second preset scrambling sequence, determining that the condition for stopping the scheduling signaling detection is satisfied.

Optionally, the method further includes:

if it is determined that the condition for stopping the scheduling signaling detection is not satisfied according to the target information, and the amount of the scheduling signaling detection on the current downlink time domain unit does not reach a preset maximum corresponding to the terminal, the scheduling signaling detection on the current downlink time domain unit continues.

According to a third aspect of the embodiments of the present disclosure, there is provided a device for detecting a scheduling signaling, including:

a sending module, configured to send target information to a terminal, wherein the target information is configured to determine whether a condition for stopping scheduling signaling detection on a current downlink time domain unit is satisfied, when the scheduling signaling detection is performed by the terminal on each downlink time domain unit.

Optionally, the target information includes any one of the following:

a maximum amount of the scheduling signalings transmitted on each downlink time domain unit;

detection indication information configured to indicate whether to stop scheduling signaling detection; and feature information configured to characterize whether to stop scheduling signaling detection.

Optionally, the sending module includes:

a first sending sub-module, configured to send the target information to the terminal through a first target signaling or a second target signaling, if the target information includes the maximum amount of the scheduling signalings transmitted on each downlink time domain unit, wherein, the first target signaling is a signaling sent to the terminal before sending the scheduling signaling; and the second target signaling is a signaling that belongs to the same downlink time domain unit as the scheduling signaling.

Optionally, the first target signaling includes any one of the following:

a radio resource control signaling, system information, a media access control address control unit, and a physical layer signaling;

the second target signaling includes any one of the following:

a common scheduling signaling for public information transmission, an exclusive scheduling signaling corresponding only to the terminal, and a predefined signaling not belonging to the scheduling signaling.

Optionally, the detection indication information includes:

a first detection indication information configured to indicate continuing the scheduling signaling detection, and a second detection indication information configured to indicate stopping the scheduling signaling detection; or a third detection indication information configured to indicate a currently remained amount of scheduling signalings to be detected.

Optionally, the sending module includes:

a second sending sub-module, configured to send the scheduling signaling carrying the target information to the terminal, if the target information includes the detection indication information.

Optionally, the target information is located at a preset position of the scheduling signaling, and the target information has a preset length.

Optionally, the feature information includes:

a first preset scrambling sequence and a second preset scrambling sequence for scrambling downlink control information;

wherein, the first preset scrambling sequence is configured to indicate continuing the scheduling signaling detection, and the second preset scrambling sequence is configured to indicate stopping the scheduling signaling detection.

Optionally, the sending module includes:

a third sending sub-module, configured to send scrambled scheduling signaling to the terminal, after scrambling the scheduling signaling through the target information.

According to a fourth aspect of the embodiments of the present disclosure, there is provided a device for detecting a scheduling signaling, wherein the device is applicable to a terminal, including:

a receiving module, configured to receive target information sent by a base station; wherein the target information is configured to determine whether a condition for stopping scheduling signaling detection on a current downlink time domain unit is satisfied, if the scheduling signaling detection is performed by the terminal on each downlink time domain unit;

a first performing module, configured to stop performing the scheduling signaling detection on the current downlink time domain unit, if it is determined that the condition for stopping the scheduling signaling detection is satisfied according to the target information, when the scheduling signaling detection is performed on each downlink time domain unit.

Optionally, the target information includes any one of the following:

a maximum amount of the scheduling signalings transmitted on each downlink time domain unit;

detection indication information configured to indicate whether to stop scheduling signaling detection; and feature information configured to characterize whether to stop scheduling signaling detection.

Optionally, the detection indication information includes:

a first detection indication information configured to indicate continuing the scheduling signaling detection, and a second detection indication information configured to indicate stopping the scheduling signaling detection; or a third detection indication information configured to indicate currently remaining amount of scheduling signalings to be detected.

Optionally, the feature information includes:

a first preset scrambling sequence and a second preset scrambling sequence for scrambling downlink control information;

wherein, the first preset scrambling sequence is configured to indicate continuing the scheduling signaling detection, and the second preset scrambling sequence is configured to indicate stopping the scheduling signaling detection.

Optionally, the first performing module includes any one of the following sub-modules:

a first determining sub-module, configured to determine whether the amount of the scheduling signalings that have been detected on the current downlink time domain unit reaches the maximum, and determine that the condition for stopping the scheduling signaling detection is satisfied if the amount of the scheduling signalings that have been detected on the current downlink time domain unit reaches the maximum amount;

a second determining sub-module, configured to determine that the condition for stopping the scheduling signaling detection is satisfied if the second detection indication information is detected on the current downlink time domain unit.

a third determining sub-module, configured to determine that the condition for stopping the scheduling signaling detection is satisfied, if the third detection indication information is detected on the current downlink time domain unit, and the currently remaining amount of the scheduling signalings to be detected indicated by the third detection indication information is zero;

a fourth determining sub-module, configured to determine that the condition for stopping the scheduling signaling detection is satisfied, when the scheduling signaling is descrambled on the current downlink time domain unit, if the scheduling signaling is descrambled through the second preset scrambling sequence.

Optionally, the device further includes:

a second performing module, configured to continue to perform the scheduling signaling detection on the current downlink time domain unit, if it is determined that the condition for stopping the scheduling signaling detection is not satisfied according to the target information, and the amount of the scheduling signaling detection on the current downlink time domain unit has not reached a preset maximum corresponding to the terminal.

According to a fifth aspect of the embodiments of the present disclosure, there is provided a computer readable storage medium, a computer program stored thereon, wherein the computer program is configured to perform the method for detecting a scheduling signaling in the above first aspect.

According to a sixth aspect of the embodiments of the present disclosure, there is provided a computer readable storage medium, a computer program stored thereon, wherein the computer program is configured to perform the method for detecting a scheduling signaling in the above second aspect.

According to a seventh aspect of the embodiments of the present disclosure, there is provided a device for detecting a scheduling signaling, wherein the device is applicable to a base station, including:

a processor; and a memory for storing instructions executable by the processor;

wherein the processor is configured to:

send target information to a terminal, wherein the target information is configured to determine whether a condition for stopping scheduling signaling detection on a current downlink time domain unit is satisfied, when the scheduling signaling detection is performed by the terminal on each downlink time domain unit.

According to an eighth aspect of the embodiments of the present disclosure, there is provided a device for detecting a scheduling signaling, where the device is applicable to a terminal, including:

a processor; and a memory configured to store instructions executable for the processor;

wherein the processor is configured to:

receive target information sent by a base station; wherein the target information is configured to determine whether a condition for stopping scheduling signaling detection on a current downlink time domain unit is satisfied, when the scheduling signaling detection is performed by the terminal on each downlink time domain unit.

stop performing the scheduling signaling detection on the current downlink time domain unit if it is determined that the condition for stopping the scheduling signaling detection is satisfied according to the target information, when the scheduling signaling detection is performed on each downlink time domain unit.

The technical solution provided by the embodiment of the present disclosure can have the following beneficial effects:

In the embodiment of the present disclosure, the base station can send the target information to the terminal, and if the terminal performs the scheduling signaling detection on each downlink time domain unit, it is determined whether the condition for stopping the scheduling signaling detection on the current downlink time domain unit is satisfied. Through the foregoing process, the base station can send to the terminal the target information configured to determine the condition for stopping scheduling signaling detection, so that the terminal stops performing the scheduling signaling detection on the current downlink time domain unit if the condition for stopping scheduling signaling detection is satisfied, so that in the dynamic scheduling process, the detection complexity of the terminal is reduced, the power consumption of the terminal is reduced, and the power of the terminal is saved.

In the embodiment of the disclosure, optionally, the target information that is sent by the base station to the terminal can include a maximum of the number of the scheduling signalings transmitted on each downlink time domain unit; or detection indication information configured to indicate whether to stop scheduling signaling detection; or feature information configured to characterize whether to stop scheduling signaling detection. Through the target information sent by the base station, the terminal is allowed to quickly determine whether the condition for stopping scheduling signaling detection is satisfied with high availability.

In the embodiment of the present disclosure, when the target information includes the maximum of the number of the scheduling signalings transmitted on each downlink time domain unit, the base station can send the target information to the terminal through a first target signaling or a second target signaling. Wherein, the first target signaling is a signaling sent to the terminal before sending the scheduling signaling; the second target signaling is a signaling that belongs to the same downlink time domain unit as the scheduling signaling. That is, the base station can send to the terminal the target information before sending the scheduling signaling, the target information configured to determine whether the condition for stopping scheduling signaling detection is satisfied. Or, the scheduling signaling and the second target signaling are sent to the terminal in the same downlink time domain unit, wherein the target information is sent through the second target signaling. Through the above process, when the amount of the scheduling signalings that have been detected on the current downlink time domain unit reaches the maximum, the terminal determines that the condition for stopping the scheduling signaling detection is satisfied, and finally the following purposes are realized: the detection complexity of the terminal is reduced, the power consumption of the terminal is reduced, and the power of the terminal is saved during the dynamic scheduling.

In the embodiment of the present disclosure, the target information can further include the detection indication information. Optionally, the detection indication information includes a first detection indication information configured to indicate continuing the scheduling signaling detection, and a second detection indication information configured to indicate stopping the scheduling signaling detection. Or the detection indication information can further include a third detection indication information configured to indicate a currently remaining amount of scheduling signalings to be detected. The base station can send the scheduling signaling carrying the target information to the terminal. If the terminal detects the second detection indication information, or detects the third detection indication information, and the currently remaining amount of the scheduling signalings to be detected indicated by the third detection indication information is zero, it can be determined that the condition for stopping the scheduling signaling detection is satisfied. The following purposes are realized: the detection complexity of the terminal is reduced, the power consumption of the terminal is reduced, and the power of the terminal is saved during the dynamic scheduling.

In the embodiment of the present disclosure, the target information can further include feature information. The base station can send the scrambled scheduling signaling to the terminal, after the scheduling signaling is scrambled through the target information. On the terminal side, if the scheduling signaling is descrambled through the second preset scrambling sequence configured to indicate stopping the scheduling signaling detection, it can be determined that the condition for stopping the scheduling signaling detection is satisfied. The following purposes are realized: the detection complexity of the terminal is reduced, the power consumption of the terminal is reduced, and the power of the terminal is saved during the dynamic scheduling.

In the embodiment of the present disclosure, when the terminal performs the scheduling signaling detection on each downlink time domain unit sent by the base station, after receiving the target information sent by the base station, it can determine whether the condition for stopping the scheduling signaling detection is satisfied according to the target information. If the condition for stopping the scheduling signaling detection is satisfied, the terminal stops performing the scheduling signaling detection on the current downlink time domain unit. Through the above process, during the dynamic scheduling, the useless scheduling signaling detection performed by the terminal can be effectively avoided, the detection complexity of the terminal is reduced, the power consumption of the terminal is reduced, and the power of the terminal is saved.

It is to be understood that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the disclosure, illustrate exemplary embodiments of the present invention. The drawings along with the specification explain the principles of the present disclosure.

DETAILED DESCRIPTION

Exemplary embodiments will be described in detail herein, examples of which are illustrated in the accompanying drawings. The following description refers to the same or similar elements in the different figures unless otherwise indicated. The embodiments described in the following exemplary embodiments do not represent all embodiments consistent with the present invention. Instead, they are merely examples of devices and methods consistent with aspects of the invention as detailed in the appended claims.

The terms used in the present disclosure are for the purpose of describing particular embodiments only, and are not intended to limit the present disclosure. As used in the present disclosure and the appended claims, the singular forms "a," "the" and "said" are intended to include the plural forms as well, unless the context clearly indicates otherwise. It should also be understood that the term "and/or" as used herein refers to and encompasses any and all possible combinations of one or more of the associated listed items.

It should be understood that although the terms first, second, third, etc. may be used to describe various information in the present disclosure, such information should not be limited to these terms. These terms are only used to distinguish the same type of information from each other. For example, the first information may also be referred to as second information without departing from the scope of the present disclosure. Similarly, the second information may also be referred to as the first information. Depending on the context, the word "if" as used herein may be interpreted as "when" or "upon" or "in response to a determination."

Figure 1:
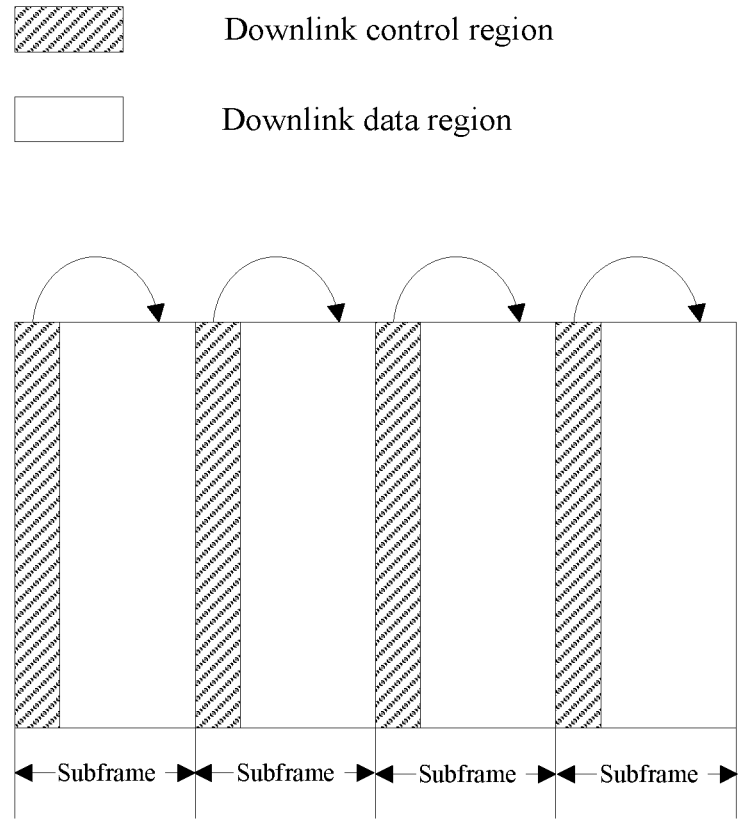
FIG. 1 is a schematic diagram illustrating a scheduling signaling detection scenario in a related art according to an exemplary embodiment.

In the related art, FIG. 1 shows a process in which the base station performs the dynamic scheduling of data transmission on the terminal. As illustrated in FIG. 1, the scheduling signaling can schedule a data carrier for a time domain unit. For example, when the scheduling signaling is a downlink scheduling signaling, the terminal can schedule one time domain unit to receive data according to the signaling. Wherein, the time domain unit can be in units of OFDM (Orthogonal Frequency Division Multiplexing) symbols, slots, subframes, radio frames or the like.

In the related art, the terminal can perform up to 44 detections on each downlink time domain unit, for example, on a subframe. However, in the 5G system, once control intervals that the terminal needs to detect are significantly increased, the detection complexity is increased for the terminal, and greater power consumption is caused.

In the embodiment of the present disclosure, in order to effectively prevent the terminal from performing invalid detection on the useless scheduling signaling and save the power of the terminal, a method for detecting a scheduling signaling is provided, which is applicable to the base station, and includes the following steps.

In step 101, the target information is sent to the terminal, wherein the target information is configured to determine whether a condition for stopping scheduling signaling detection on a current downlink time domain unit is satisfied, when the terminal performs the scheduling signaling detection on each downlink time domain unit.

In the above embodiment, the base station can send the target information to the terminal, and if the terminal performs the scheduling signaling detection on each downlink time domain unit, it is determined whether the condition for stopping the scheduling signaling detection on the current downlink time domain unit is satisfied. Through the foregoing process, the base station can send the target information to the terminal, the target information configured to determine the condition for stopping scheduling signaling detection, so that the terminal stops the scheduling signaling detection on the current downlink time domain unit, if the condition for stopping scheduling signaling detection is satisfied, so that in the dynamic scheduling process, the detection complexity of the terminal is reduced, the power consumption of the terminal is reduced, and the power of the terminal is saved.

In an embodiment of the present disclosure, optionally, the base station can determine whether the terminal needs to receive or transmit data based on scheduling according to the current uplink and downlink service requirements of the terminal, and further transmit the target information to the terminal when determining that the terminal needs to receive or transmit data based on scheduling.

For example, for the terminal that supports a service type with a low latency requirement, the base station can perform scheduling-based data reception or transmission on the terminal, and can send target information to the terminal at this time, thereby reducing detection complexity for the terminal.

wherein the target information includes any one of the following:

a maximum of the amount of the scheduling signalings transmitted on each downlink time domain unit;

detection indication information configured to indicate whether to stop scheduling signaling detection; and feature information configured to characterize whether to stop scheduling signaling detection.

The step 101 is described below for different target information.

In the first case, the target information includes the maximum of the amount of the scheduling signalings transmitted on each downlink time domain unit.

In this case, the maximum of the amount of the scheduling signalings that can be transmitted on each downlink time domain unit such as each downlink subframe is taken as the target information configured to determine whether the condition for stopping the scheduling signaling detection is satisfied.

In step 101, the base station can send the target information to the terminal through the first target signaling or the second target signaling.

Wherein, the first target signaling is a signaling sent to the terminal before sending the scheduling signaling. Optionally, the first target signaling can be an RRC (Radio Resource Control) signaling, a system message, a MAC CE (MAC Control Element) or a physical layer signaling. That is, the base station can send the maximum of the amount of the scheduling signalings transmitted on each downlink time domain unit to the terminal before sending the scheduling signaling.

The second target signaling detection indication information can further include a third detection indication information configured to indicate currently remaining amount of scheduling signalings to be detected. Optionally, the second target signaling can be a common scheduling signaling for public information transmission, or an exclusive scheduling signaling corresponding only to the terminal, or a predefined signaling not belonging to the scheduling signaling. That is, the second target signaling can multiplex the scheduling signaling, for example, the second target signaling can be the common scheduling signaling or the exclusive scheduling signaling. The second target signaling may also not multiplex the scheduling signaling, but instead adopt a predefined individual signaling. However, the second target signaling and the scheduling signaling should belong to the same downlink time domain unit.

After the terminal receives the target information, if the amount of the scheduling signalings that have been detected on the current downlink time domain unit reaches the maximum, it is indicated that the terminal has detected all the scheduling signaling transmitted on the current downlink time domain unit, and it is determined that the condition for stopping the scheduling signaling detection is satisfied, thus it is not necessary to continue the scheduling signaling detection on the current downlink time domain unit.

In the second case, the target information includes the detection indication information configured to indicate whether to stop performing the scheduling signaling detection.

In the embodiment of the disclosure, the target information can be carried by the scheduling signaling, that is, the detection indication information can be carried in the scheduling signaling. Optionally, a region can be defined in the scheduling signaling, wherein the region is configured to carry the target information, that is, the detection indication information. Further, the target information can be located at a preset position of the scheduling signaling, and the target information can have a preset length. That is, the detection indication information can be located at a preset position of the scheduling signaling and have the preset length.

Optionally, the detection indication information can include a first detection indication information configured to indicate continuing the scheduling signaling detection, and a second detection indication information configured to indicate stopping the scheduling signaling detection.

At this time, the detection indication information can adopt different preset values to indicate whether it is necessary to continue the scheduling signaling detection. For example, the detection indication information can occupy a length of 1 bit, and the value of the first detection indication information can be 1 which indicates continuing the scheduling signaling detection; the value of the second detection indication information can be 0, which indicates stopping the scheduling signaling detection.

In step 101, the base station can send the detection indication information carried in the scheduling signaling to the terminal.

Of course, in the embodiment of the present disclosure, the first detection indication information and the second detection indication information can be configured to indicate whether it is necessary to perform the scheduling signaling detection on the current downlink time domain unit, and can further be configured to indicate whether it is necessary to continue to perform the scheduling signaling detection on the subsequent downlink time domain unit.

Alternatively, in the embodiment of the present disclosure, the detection indication information can further include a third detection indication information configured to indicate currently remaining amount of scheduling signalings to be detected.

At this time, the scheduling signalings can be arranged in sequence. The base station can add the third detection indication information to a preset location corresponding to each scheduling signaling. The third detection indication information is configured to indicate the currently remaining amount of the scheduling signalings to be detected.

For example, the third detection indication information may be respectively added to the N scheduling signalings arranged in sequence, and the third detection indication information respectively corresponds to the number N−1, N−2, . . . 0 of the currently remaining amount of the scheduling signalings to be detected.

In the step 101, the base station can carry the third detection indication information in the scheduling signalings, and send the third detection indication information to the terminal while sending the scheduling signalings. After receiving the scheduling signalings, the terminal can determine whether the condition for stopping the scheduling signaling detection is satisfied according to the value of the corresponding detection indication information in the scheduling signalings. If the value indicated by the third detection indication information carried in the scheduling signalings is 0, the terminal determines that the condition for stopping the scheduling signaling detection is satisfied.

In a third case, the target information includes the feature information configured to indicate whether to stop performing the scheduling signaling detection.

Optionally, the feature information can include: a first preset scrambling sequence and a second preset scrambling sequence configured to scramble downlink control information; wherein, the first preset scrambling sequence is configured to indicate continuing the scheduling signaling detection, and the second preset scrambling sequence is configured to indicate stopping the scheduling signaling detection.

In the embodiment of the present disclosure, two preset scrambling sequences can be provided, wherein the first preset scrambling sequence is configured to indicate continuing the scheduling signaling detection, and the second preset scrambling sequence is configured to indicate stopping the scheduling signaling detection. Different scheduling signalings can be scrambled through the preset scrambling sequence.

In the step 101, after the scheduling signalings are scrambled through the target information, the scrambled scheduling signalings can be sent to the terminal. After the scrambled scheduling signalings are received by the terminal, the scrambled scheduling signalings can be descrambled through the preset scrambling sequence. If the scheduling signalings are successfully descrambled through the second preset scrambling sequence, it can be determined that the condition for stopping the scheduling signaling detection is satisfied.

In the embodiment of the present disclosure, optionally, a plurality of preset scrambling sequences can be further provided, which respectively correspond to currently remaining amount of scheduling signalings to be detected. The scheduling signalings are scrambled by a plurality of preset scrambling sequences and then sent to the terminal. After the scrambled scheduling signalings are received by the terminal, the scheduling signalings are descrambled by a plurality of preset scrambling sequences. If the scheduling signalings are successfully descrambled by the preset scrambling sequence, it can be determined that the condition for stopping the scheduling signaling detection is satisfied, wherein the currently remaining amount of scheduling signalings to be detected corresponding to the target preset scrambling sequence is zero.

Figure 2:
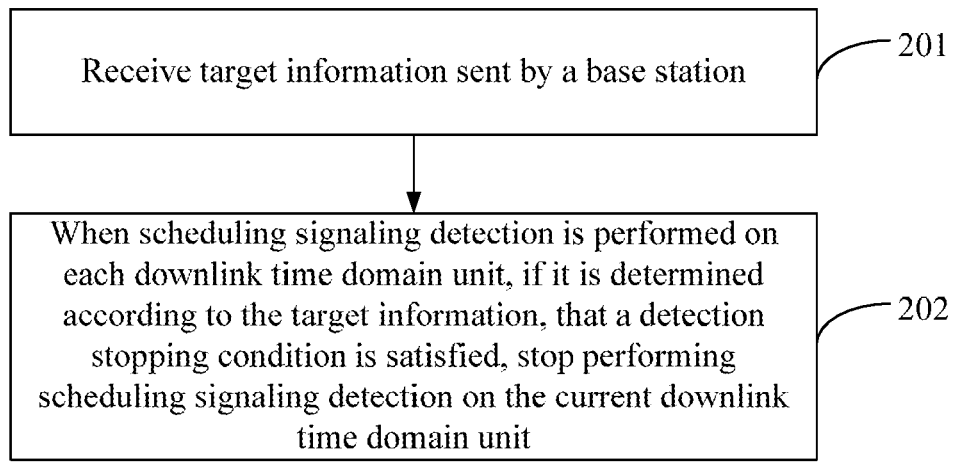
FIG. 2 is a flowchart illustrating a method for detecting a scheduling signaling according to an exemplary embodiment.

The embodiment of the present disclosure provides another method for detecting a scheduling signaling, which can be applicable to a terminal. Referring to FIG. 2, FIG. 2 is another method for detecting a scheduling signaling according to an embodiment, including the following steps:

In step 201, the target information sent by the base station is received; wherein the target information is configured to determine whether a condition for stopping scheduling signaling detection on a current downlink time domain unit is satisfied, when the terminal performs the scheduling signaling detection on each downlink time domain unit;

In step 202, when the scheduling signaling detection is performed on each downlink time domain unit, if it is determined that the condition for stopping the scheduling signaling detection is satisfied according to the target information, the scheduling signaling detection on the current downlink time domain unit is stopped.

In the above embodiment, when the terminal performs the scheduling signaling detection on each downlink time domain unit sent by the base station after receiving the target information sent by the base station, it can determine whether the condition for stopping the scheduling signaling detection is satisfied according to the target information. If the condition for stopping the scheduling signaling detection is satisfied, the terminal stops performing the scheduling signaling detection on the current downlink time domain unit. Through the above process, during the dynamic scheduling, the invalid scheduling signaling detection performed by the terminal can be effectively avoided, the detection complexity of the terminal is reduced, the power consumption of the terminal is reduced, and the power of the terminal is saved.

For the above step 201, the base station can send any one of the target information to the terminal through the above method, and the terminal can directly receive it according to the related art.

For the above step 202, in the related art, the terminal can search for the corresponding DCI formats (Downlink Control Information Format) according to the transmission mode supported by the terminal in the search space where the downlink control information is located, thereby implementing the scheduling signaling detection.

In this step, the terminal can perform the scheduling signaling detection on each downlink time domain unit according to the above related art. In the detection process, if it is determined that the condition for stopping the scheduling signaling detection is satisfied, the scheduling signaling detection on the current downlink time domain unit is stopped.

wherein, if the target information includes the maximum of the amount of the scheduling signalings transmitted on each downlink time domain unit, the terminal needs to determine whether amount of the scheduling signalings that have been detected on the current downlink time domain unit reaches the maximum. If the amount of the scheduling signalings that have been detected on the current downlink time domain unit reaches the maximum, then even if the scheduling signaling detection is continued, no scheduling signaling can be detected. In order to effectively avoid invalid scheduling signaling detection, it can be determined that the condition for stopping the scheduling signaling detection is satisfied.

The detection indication information includes a first detection indication information configured to indicate continuing the scheduling signaling detection, and a second detection indication information configured to indicate stopping the scheduling signaling detection. When the second detection indication information can be detected in the current downlink time domain unit by the terminal, it can be determined that the condition for stopping the scheduling signaling detection is satisfied.

The target information includes a third detection indication information configured to indicate a currently remaining amount of scheduling signalings to be detected. When the third detection indication information is detected by the terminal on the current downlink time domain unit, and the currently remaining amount of the scheduling signalings to be detected indicated by the third detection indication information is zero, it can be determined that the terminal has detected all the scheduling signaling transmitted on the current downlink time domain unit, and it can be determined that the condition for stopping the scheduling signaling detection is satisfied.

When the target information includes a first preset scrambling sequence and a second preset scrambling sequence configured to scrambling downlink control information, the terminal may attempt to descramble the scheduling signaling through the first preset scrambling sequence and the second preset scrambling sequence respectively. If the scheduling signaling is descrambled through the second preset scrambling sequence, it can be determined that the condition for stopping the scheduling signaling detection is satisfied.

Or, the target information can further include a plurality of preset scrambling sequences corresponding to the currently remaining amount of scheduling signalings to be detected. If the terminal descrambles the scheduling signaling through the target preset scrambling sequence, the terminal can determine that the condition for stopping the scheduling signaling detection is satisfied. The target preset scrambling sequence is a preset scrambling sequence corresponding to the currently remaining amount of scheduling signalings to be detected.

Through the above process, when the condition for stopping the scheduling signaling detection is satisfied, the scheduling signaling detection on the current downlink time domain unit will be stopped, so that in the dynamic scheduling process, the detection complexity of the terminal is reduced, the power consumption of the terminal is reduced, and the power of the terminal is saved.

Figure 3:
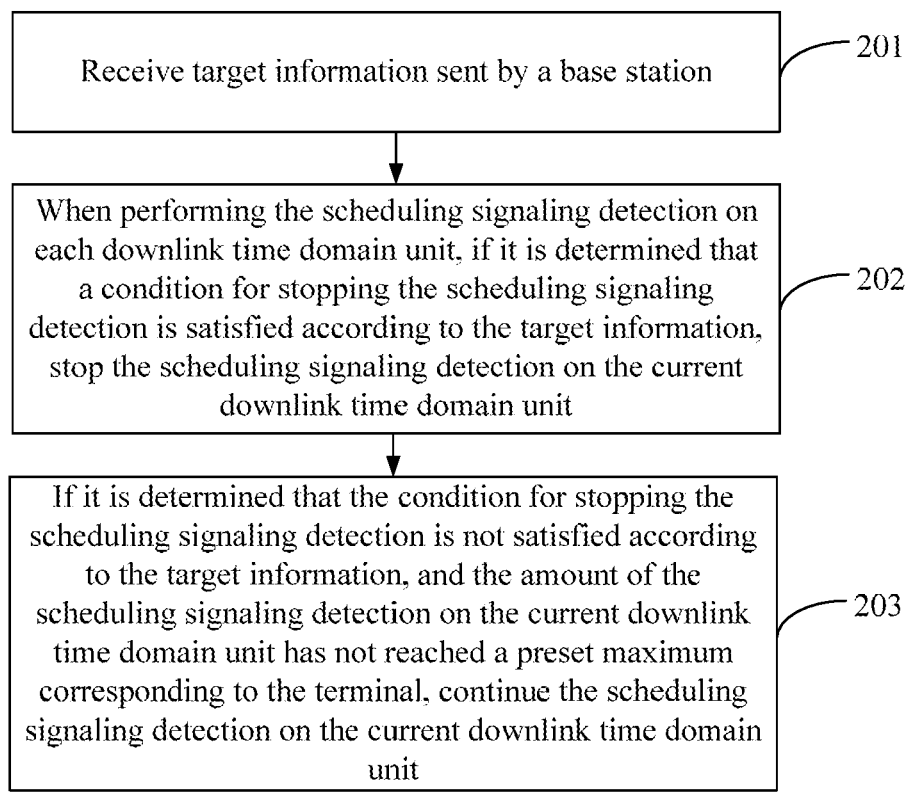
FIG. 3 is a flowchart illustrating another method for detecting a scheduling signaling according to an exemplary embodiment.

In an embodiment, referring to FIG. 3, FIG. 3 is a flowchart of another method for detecting a scheduling signaling on the basis of the embodiment illustrated in FIG. 2, further including:

in step 203, if it is determined that the condition for stopping the scheduling signaling detection is not satisfied according to the target information, and the amount of the scheduling signaling detection on the current downlink time domain unit has not reached a preset maximum corresponding to the terminal, the scheduling signaling detection on the current downlink time domain unit continues.

In this step, if it is determined that the condition for stopping the scheduling signaling detection is not satisfied according to the target information, and the amount of the scheduling signaling detection on the current downlink time domain unit has not reached a preset maximum corresponding to the terminal, the terminal can continue to perform the scheduling signaling detection on the current downlink time domain unit according to the related art.

In the foregoing embodiment, in a process in which the base station performs the dynamic scheduling on the terminal, if it is determined that the condition for stopping the scheduling signaling detection is not satisfied according to the target information sent by the base station, the scheduling signaling detection on the current downlink time domain unit can be continued; if it is determined that the condition for stopping the scheduling signaling detection is satisfied according to the target information, the scheduling signaling detection on the current downlink time domain unit will be stopped immediately. The complexity of the scheduling signaling detection is effectively reduced, the power consumption of the terminal is reduced, and the power of the terminal is saved.

Figure 4:
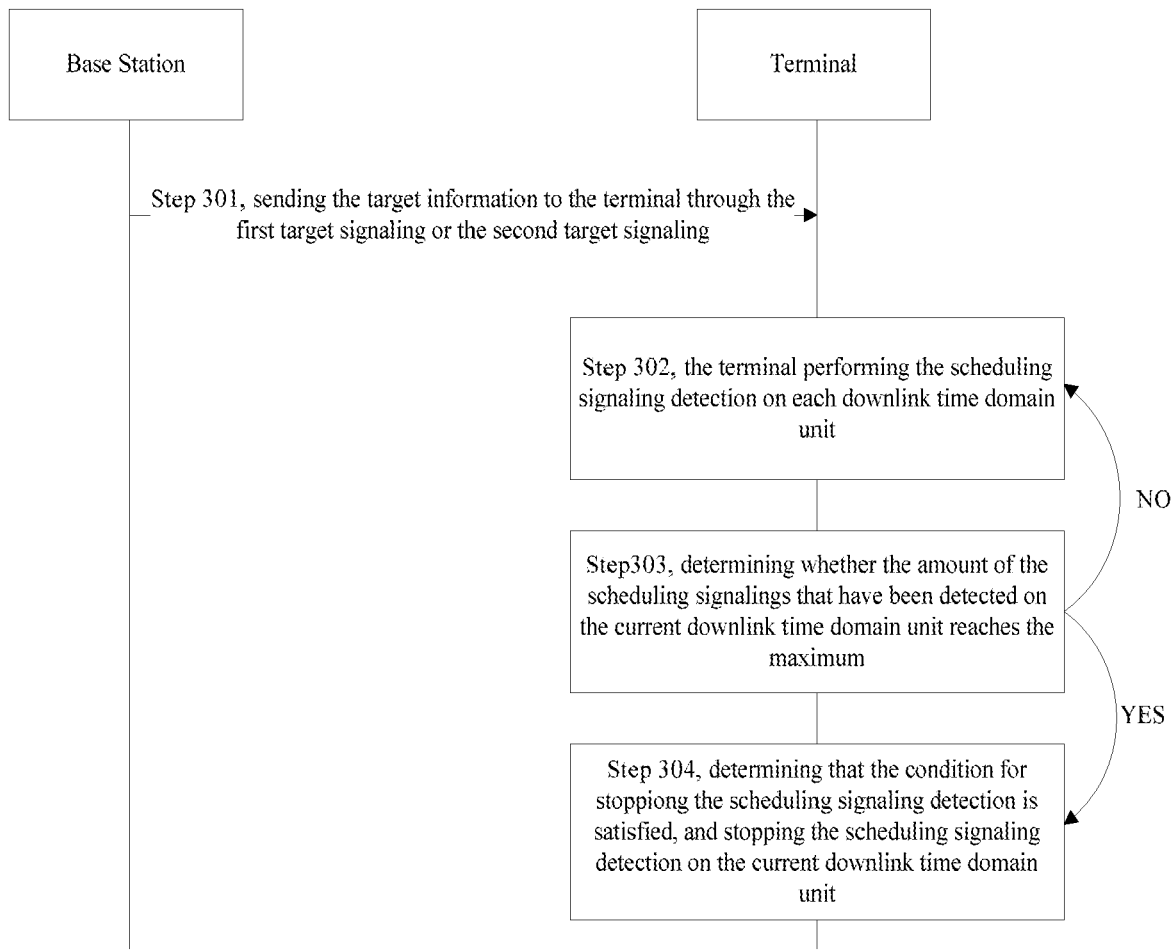
FIG. 4 is a flowchart illustrating another method for detecting a scheduling signaling according to an exemplary embodiment.

Referring to FIG. 4, FIG. 4 is a method for detecting a scheduling signaling according to another embodiment, including the following steps:

in step 301, the base station sends the target information to the terminal through the first target signaling or the second target signaling.

Wherein the target information includes a maximum of the amount of the scheduling signalings transmitted on each downlink time domain unit.

In step 302, the terminal performs the scheduling signaling detection on each downlink time domain unit.

In step 303, the terminal determines whether the amount of the scheduling signalings that have been detected on the current downlink time domain unit reaches the maximum.

If the amount of the scheduling signalings that have been detected on the current downlink time domain unit reaches the maximum, the step 304 is performed, and if the number does not reach the maximum, then then step 302 is performed.

In step 304, the terminal determines that the condition for stopping the scheduling signaling detection is satisfied, and the scheduling signaling detection on the current downlink time domain unit is stopped.

Of course, in the above embodiment, the amount of the scheduling signaling detection on the current downlink time domain unit does not reach the preset detection amount.

Figure 5:
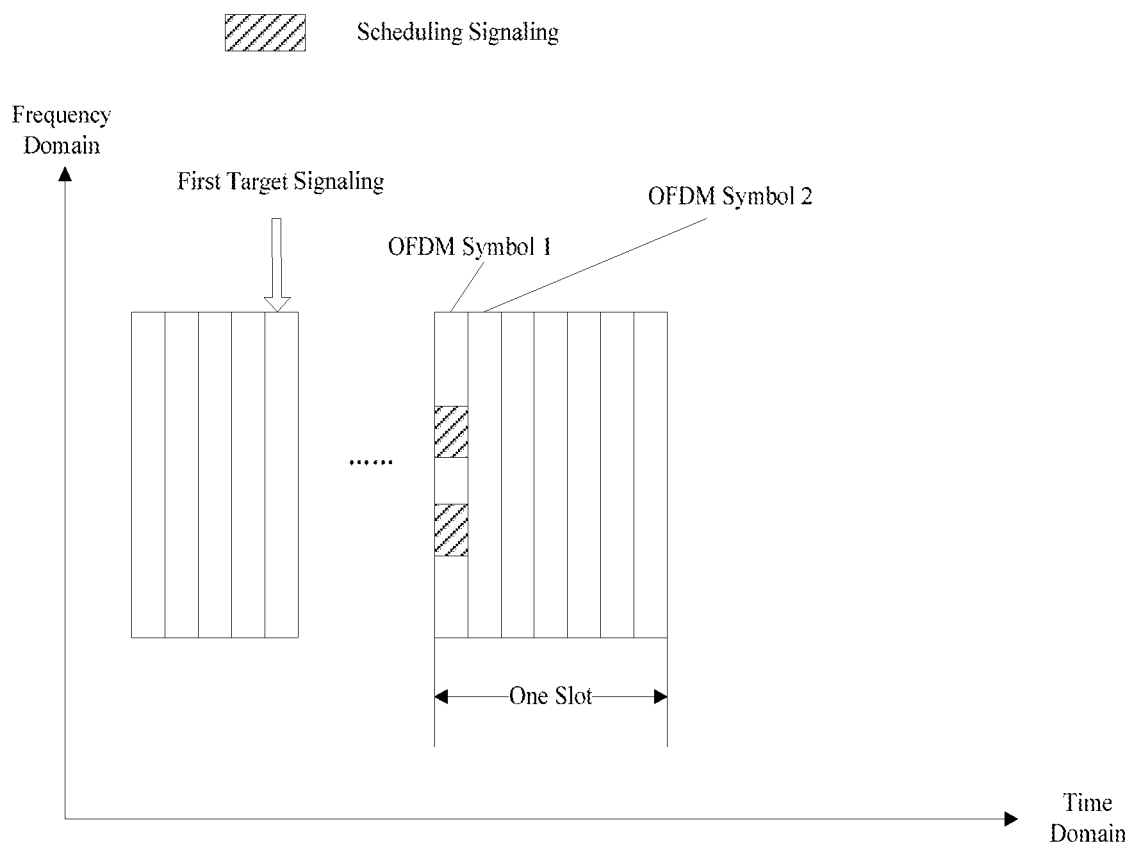
FIG. 5 is a schematic diagram illustrating a scheduling signaling detection scenario according to an exemplary embodiment.

The foregoing process is further illustrated in FIG. 5. The base station can send the maximum to the terminal through the first target signaling. For example, the downlink control region on one slot includes 2 OFDM symbols, and the maximum of the scheduling signalings transmitted on one slot is 2, and the terminal has detected 2 scheduling signalings on the OFDM symbol 1. Then, the terminal can determine that the condition for stopping the scheduling signaling detection is satisfied, and the scheduling signaling detection on the current slot is stopped. That is, there is no need to detect the scheduling signaling on the OFDM symbol 2.

In the above embodiment, the target information that is sent by the base station to the terminal can include a maximum of the number of the scheduling signalings transmitted on each downlink time domain unit; or detection indication information configured to indicate whether to stop scheduling signaling detection; or feature information configured to characterize whether to stop scheduling signaling detection. Through the target information sent by the base station, the terminal is allowed to quickly determine whether the condition for stopping scheduling signaling detection is satisfied with high availability.

Figure 6:
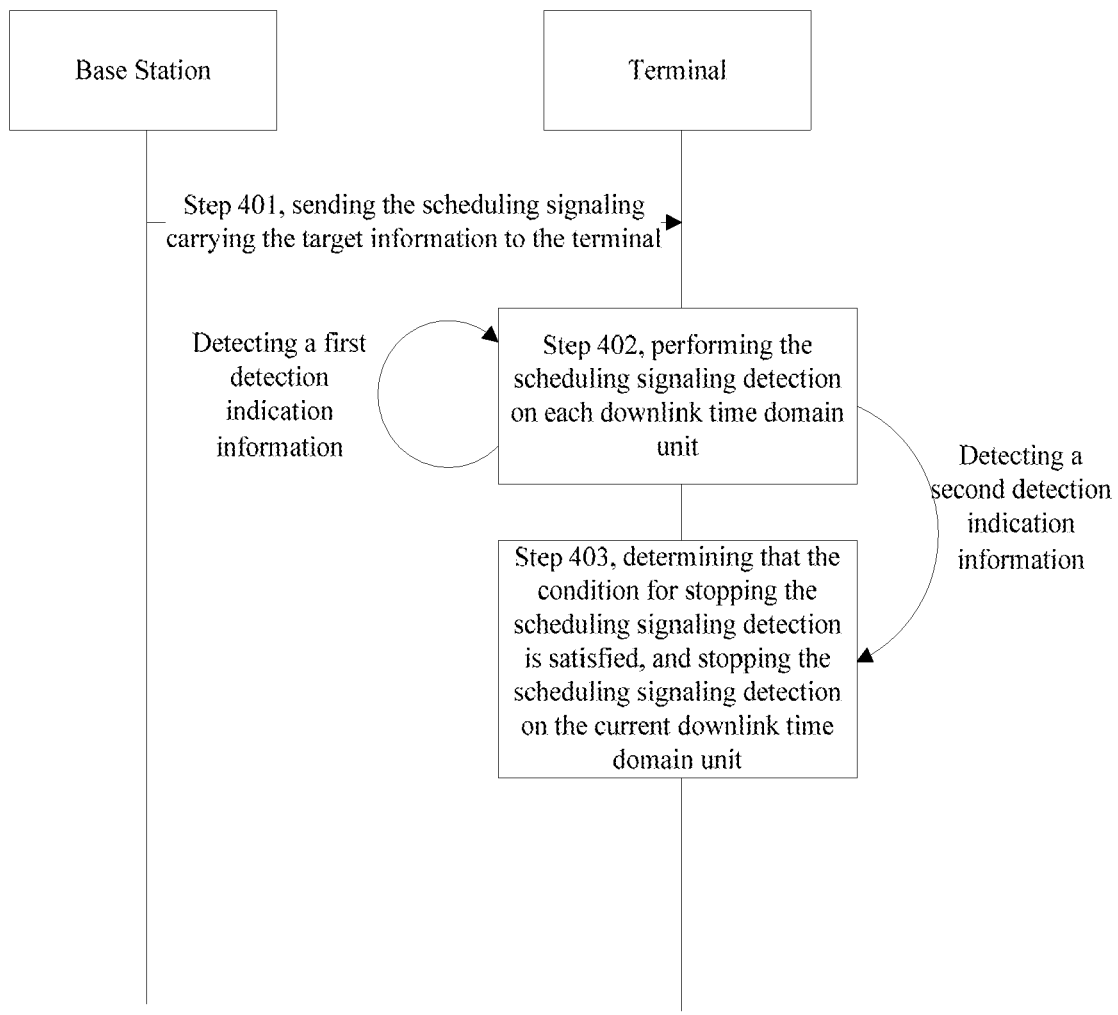
FIG. 6 is a flowchart illustrating another method for detecting a scheduling signaling according to an exemplary embodiment.

Referring to FIG. 6, FIG. 6 is a method for detecting a scheduling signaling according to another embodiment, including the following steps:

in step 401, the base station sends the scheduling signalings carrying the target information to the terminal.

Wherein, the target information includes the detection indication information configured to indicate whether to stop the scheduling signaling detection. Optionally, the detection indication information may include a first detection indication information configured to indicate continuing the scheduling signaling detection, and a second detection indication information configured to indicate stopping the scheduling signaling detection.

In step 402, the terminal performs the scheduling signaling detection on each downlink time domain unit.

When the second detection indication information is detected upon the terminal detects the current downlink time domain unit, the step 403 is performed, and if the first detection indication information is detected, the step 402 is continued.

In step 403, the terminal determines that the condition for stopping the scheduling signaling detection is satisfied, and the scheduling signaling detection on the current downlink time domain unit is stopped.

Of course, in the above embodiment, the amount of the scheduling signaling detection on the current downlink time domain unit does not reach the preset detection amount.

Figure 7:
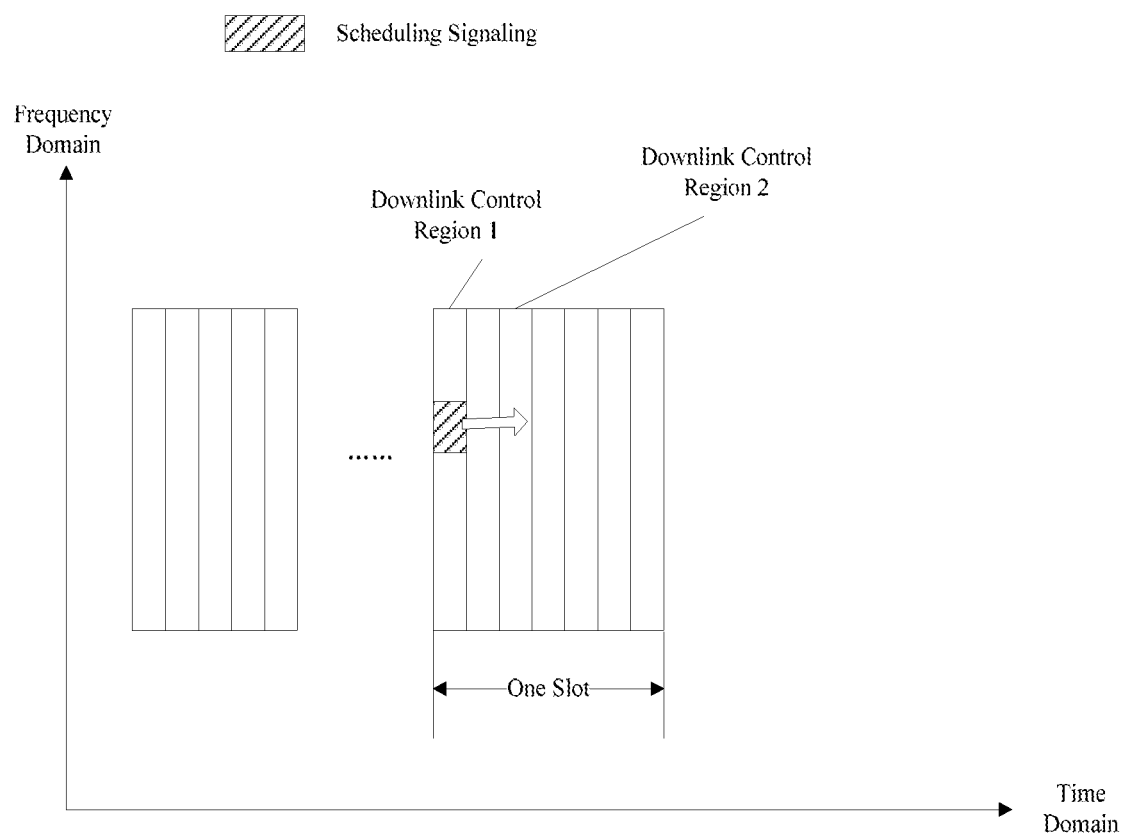
FIG. 7 is a schematic diagram illustrating another scheduling signaling detection scenario according to an exemplary embodiment.

The foregoing process is further illustrated in FIG. 7. The base station can send the scheduling signalings carrying the target information to the terminal. For example, if the terminal detects the first detection indication information (that is, the detection indication information with the value of 1) in the downlink control region 1 on a certain slot, the terminal continues to perform the scheduling signaling detection on the downlink control region 2. If the second detection indication information ((that is, the detection indication information with the value of 0), that is, the detection indication information whose value is 0, the terminal stops performing the scheduling signaling detection on the downlink control region 2.

In the foregoing embodiment, the detection indication information further includes a third detection indication information configured to indicate the currently remaining amount of scheduling signalings to be detected. If the terminal detects the third detection indication information with the value of 0 in the downlink control region 1, it is determined that the condition for stopping the scheduling signaling detection is satisfied, and there is no need to perform the scheduling signaling detection on the downlink control region 2. Otherwise, the terminal still needs to perform the scheduling signaling detection on the downlink control region 2.

In the above embodiment, the target information can further include the detection indication information. Optionally, the detection indication information includes a first detection indication information configured to indicate that the scheduling signaling detection needs to be continued, and a second detection indication information configured to indicate stopping the scheduling signaling detection. Or the detection indication information can further include a third detection indication information configured to indicate the currently remaining amount of scheduling signalings to be detected. The base station can send the scheduling signalings carrying the target information to the terminal. When the terminal detects the second detection indication information, or detects the third detection indication information, and the currently remaining amount of the scheduling signalings to be detected indicated by the third detection indication information is zero, it can be determined that the condition for stopping the scheduling signaling detection is satisfied. The following purposes are realized: the detection complexity of the terminal is reduced, the power consumption of the terminal is reduced, and the power of the terminal is saved during the dynamic scheduling.

Figure 8:
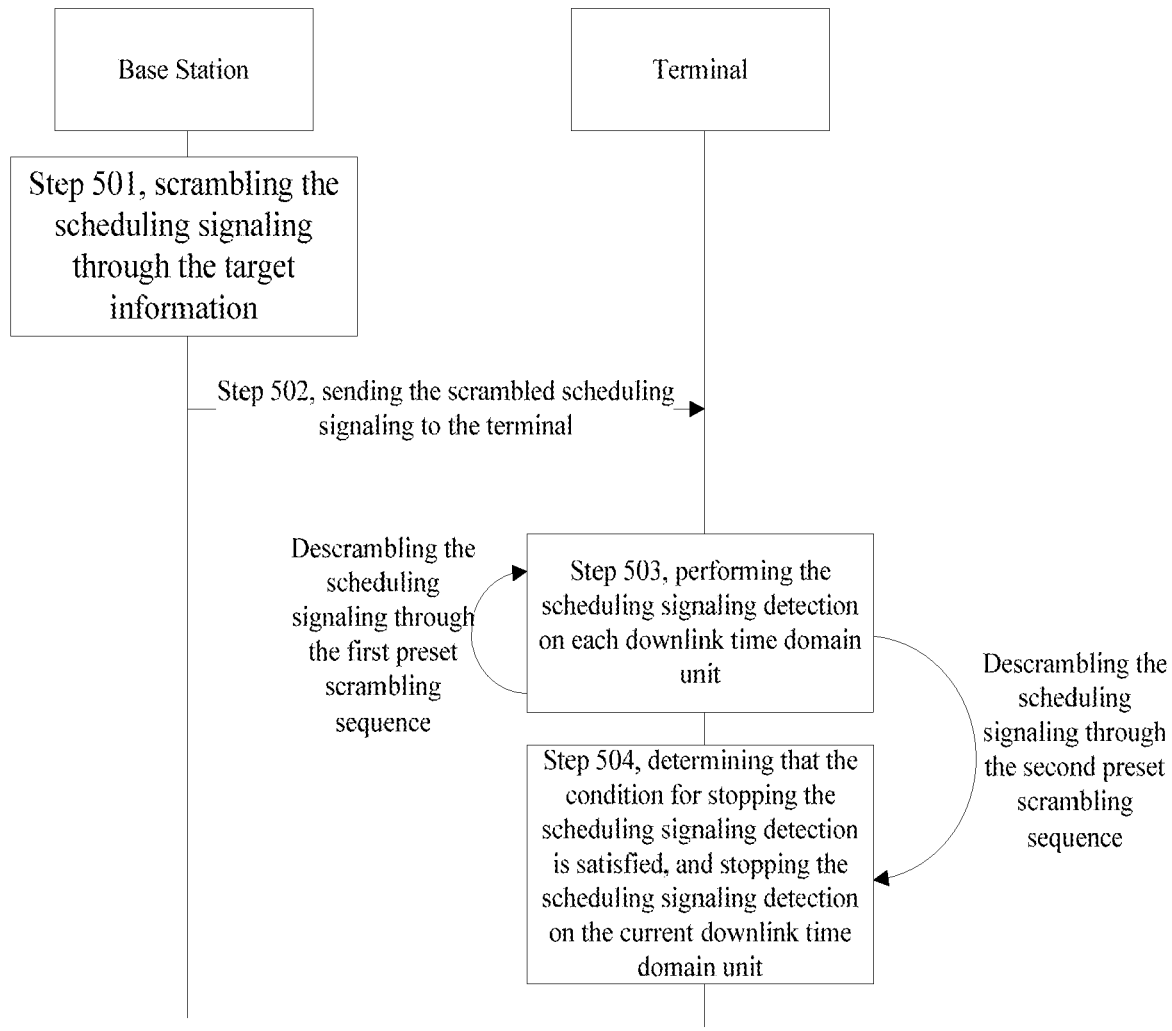
FIG. 8 is a flowchart illustrating another method for detecting a scheduling signaling according to an exemplary embodiment.

Referring to FIG. 8, FIG. 8 is a method for detecting a scheduling signaling according to another embodiment, including the following steps:

In step 501, the base station scrambles the scheduling signalings through the target information.

wherein the target information includes the feature information configured to characterize whether to stop scheduling signaling detection. Optionally, the feature information includes a first preset scrambling sequence and a second preset scrambling sequence for scrambling downlink control information; wherein, the first preset scrambling sequence is configured to indicate continuing the scheduling signaling detection, and the second preset scrambling sequence is configured to indicate stopping the scheduling signaling detection.

In step 502, the base station sends the scrambled scheduling signalings to the terminal.

In step 503, the terminal performs the scheduling signaling detection on each downlink time domain unit.

After the terminal descrambles the scheduling signalings on the current downlink time domain unit through the second preset scrambling sequence, the step 504 is performed. If the scheduling signalings are descrambled through the first preset scrambling sequence, the step 503 is performed.

In step 504, the terminal determines that the condition for stopping the scheduling signaling detection is satisfied, and the scheduling signaling detection on the current downlink time domain unit is stopped.

Of course, in the above embodiment, the amount of the scheduling signaling detection on the current downlink time domain unit does not reach the preset detection amount.

In the embodiment of the disclosure, the target information can also be a plurality of preset scrambling sequences, which respectively correspond to currently remaining amount of scheduling signalings to be detected. The scheduling signalings are scrambled by a plurality of preset scrambling sequences and then sent to the terminal. After the scrambled scheduling signalings are received by the terminal, the scheduling signalings are descrambled through a plurality of preset scrambling sequences. If the scheduling signalings are successfully descrambled through the target preset scrambling sequence, it can be determined that the condition for stopping the scheduling signaling detection is satisfied. Wherein, the currently remaining amount of scheduling signalings to be detected corresponding to the target preset scrambling sequence is zero.

In the above embodiment, the target information can further include feature information. The base station can send the scrambled scheduling signalings to the terminal, after the scheduling signalings are scrambled through the target information. On the terminal side, if the scheduling signalings are descrambled through the second preset scrambling sequence configured to indicate stopping the scheduling signaling detection, it can be determined that the condition for stopping the scheduling signaling detection is satisfied. The following purposes are realized: the detection complexity of the terminal is reduced, the power consumption of the terminal is reduced, and the power of the terminal is saved during the dynamic scheduling.

Corresponding to the embodiment of the foregoing application function implementation method, the present disclosure further provides the embodiments of the application function implementation device and the corresponding terminal.

Figure 9:
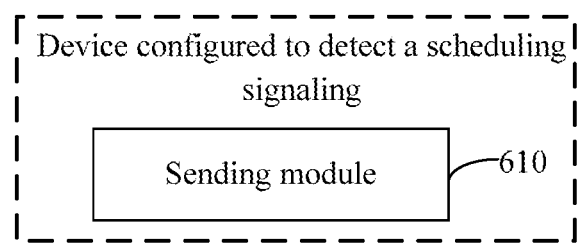
FIG. 9 is a block diagram illustrating a device for detecting a scheduling signaling according to an exemplary embodiment.

Referring to FIG. 9, which is a block diagram of a device for detecting a scheduling signaling according to an exemplary embodiment, the device is applicable to a base station, including: a sending module 610.

The sending module 610 is configured to send target information to a terminal, wherein the target information is configured to determine whether a condition for stopping scheduling signaling detection on a current downlink time domain unit is satisfied, when the scheduling signaling detection is performed by the terminal on each downlink time domain unit.

Optionally, the target information includes any one of the following:

a maximum amount of the scheduling signalings transmitted on each downlink time domain unit;

detection indication information configured to indicate whether to stop scheduling signaling detection; and feature information configured to characterize whether to stop scheduling signaling detection.

Figure 10:
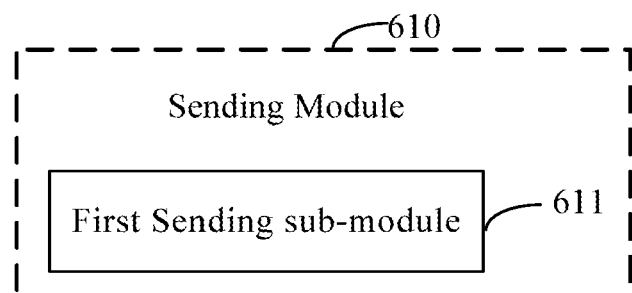
FIG. 10 is a block diagram illustrating another device for detecting a scheduling signaling according to an exemplary embodiment.

Referring to FIG. 10, which is a block diagram of another device for detecting a scheduling signaling on the basis of the embodiment illustrated in FIG. 9, the sending module 610 includes: a first sending sub-module 611.

The first sending sub-module 611 is configured to send the target information to the terminal through a first target signaling or a second target signaling, when the target information includes the maximum amount of the scheduling signalings transmitted on each downlink time domain unit;

wherein, the first target signaling is a signaling sent to the terminal before sending the scheduling signalings; the second target signaling is a signaling that belongs to the same downlink time domain unit as the scheduling signalings.

Optionally, the first target signaling includes any one of the following:

a radio resource control signaling, system information, a media access control address control unit, and a physical layer signaling;

the second target signaling includes any one of the following:

a common scheduling signaling for public information transmission, an exclusive scheduling signaling corresponding only to the terminal, and a predefined signaling not belonging to the scheduling signalings.

Optionally, the detection indication information includes:

a first detection indication information configured to indicate continuing the scheduling signaling detection, and a second detection indication information configured to indicate stopping the scheduling signaling detection; or a third detection indication information configured to indicate currently remaining amount of scheduling signalings to be detected.

Figure 11:
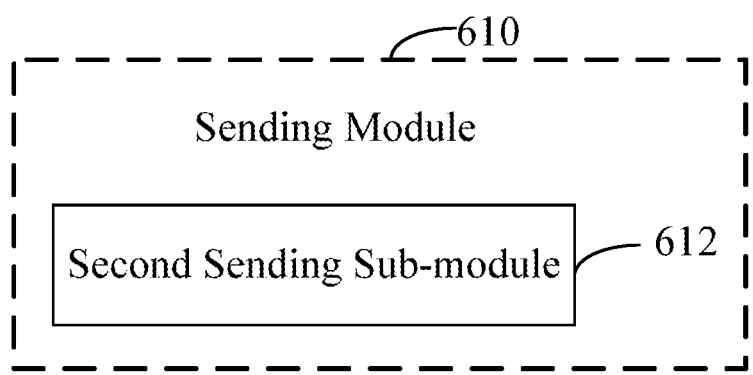
FIG. 11 is a block diagram illustrating another device for detecting a scheduling signaling according to an exemplary embodiment.

Referring to FIG. 11, which is a block diagram of another device for detecting a scheduling signaling on the basis of the embodiment illustrated in FIG. 9, the sending module 610 includes: a second sending sub-module 612.

The second sending sub-module 612 is configured to send the scheduling signalings carrying the target information to the terminal, when the target information includes the detection indication information.

Optionally, the target information is located at a preset position of the scheduling signalings, and the target information has a preset length.

Optionally, the feature information includes:

a first preset scrambling sequence and a second preset scrambling sequence configured to scramble downlink control information;

wherein, the first preset scrambling sequence is configured to indicate continuing the scheduling signaling detection, and the second preset scrambling sequence is configured to indicate stopping the scheduling signaling detection.

Figure 12:
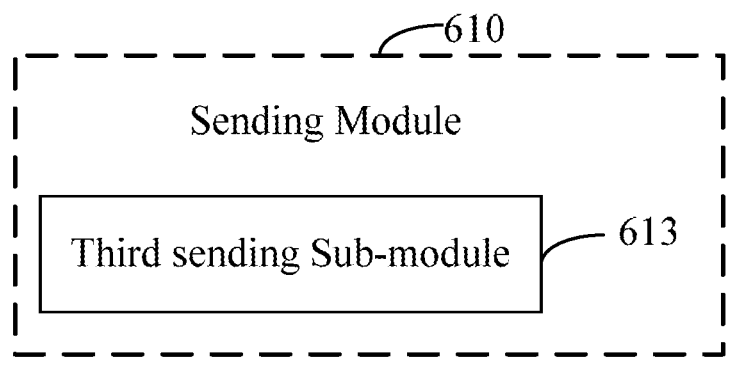
FIG. 12 is a block diagram illustrating another device for detecting a scheduling signaling according to an exemplary embodiment.

Referring to FIG. 12, which is a block diagram of another device for detecting a scheduling signaling on the basis of the embodiment illustrated in FIG. 9, the sending module 610 includes: a third sending sub-module 613.

The third sending sub-module 613 is configured to send scrambled scheduling signalings to the terminal, after the scheduling signalings are scrambled through the target information.

Figure 13:
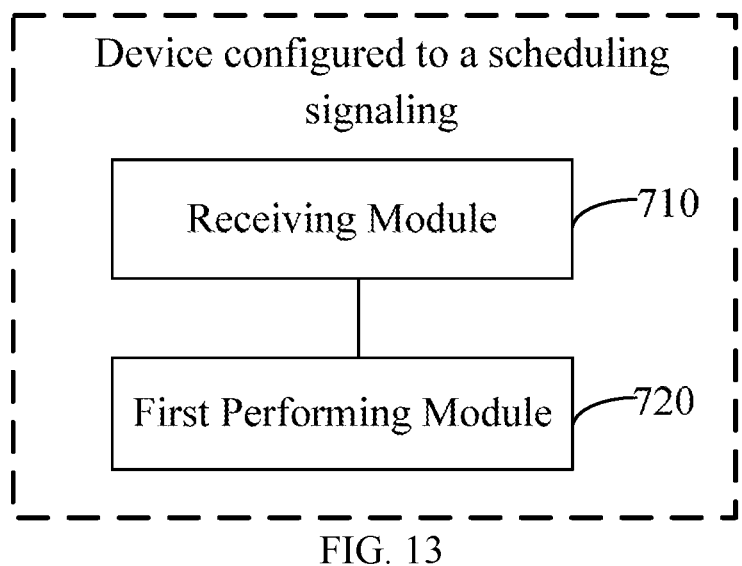
FIG. 13 is a block diagram illustrating another device for detecting a scheduling signaling according to an exemplary embodiment.

Referring to FIG. 13, which is a block diagram of a device for detecting a scheduling signaling according to an exemplary embodiment, the device is applicable to a terminal, and includes: a receiving module 710 and a first performing module 720.

The receiving module 710 is configured to receive target information sent by a base station; wherein the target information is configured to determine whether a condition for stopping scheduling signaling detection on a current downlink time domain unit is satisfied, when the scheduling signaling detection is performed by the terminal on each downlink time domain unit.

The first performing module 720 is configured to stop performing the scheduling signaling detection on the current downlink time domain unit, when the scheduling signaling detection is performed on each downlink time domain unit, if it is determined that the condition for stopping the scheduling signaling detection is satisfied according to the target information.

Optionally, the target information includes any one of the following:

a maximum amount of the scheduling signalings transmitted on each downlink time domain unit;

detection indication information configured to indicate whether to stop scheduling signaling detection; and feature information configured to characterize whether to stop scheduling signaling detection.

Optionally, the detection indication information includes:

a first detection indication information configured to indicate continuing the scheduling signaling detection, and a second detection indication information configured to indicate stopping the scheduling signaling detection is stopped; or a third detection indication information configured to indicate the currently remaining amount of scheduling signalings to be detected.

Optionally, the feature information includes:

a first preset scrambling sequence and a second preset scrambling sequence for scrambling downlink control information;

wherein, the first preset scrambling sequence is configured to indicate continuing the scheduling signaling detection, and the second preset scrambling sequence is configured to indicate stopping the scheduling signaling detection.

Figure 14:
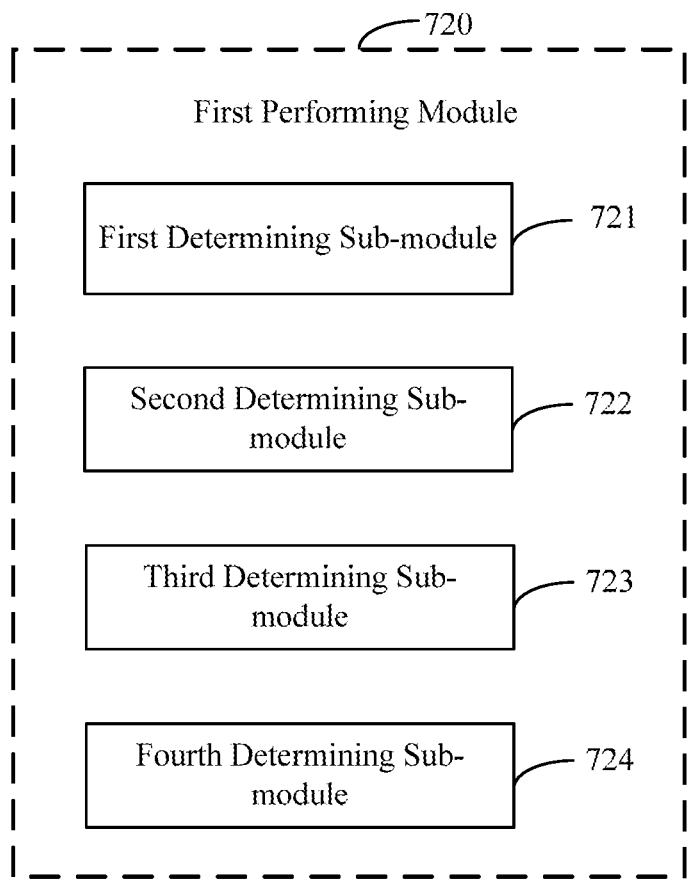
FIG. 14 is a block diagram illustrating another device for detecting a scheduling signaling according to an exemplary embodiment.

Referring to FIG. 14, which is a block diagram of another device for detecting a scheduling signaling on the basis of the embodiment illustrated in FIG. 13, the first performing module 720 includes any one of the following sub-modules: a first determining sub-module 721, a second determining sub-module 722, a third determining sub-module 723, and a fourth determining sub-module 724.

The first determining sub-module 721 is configured to determine whether the amount of the scheduling signalings that have been detected on the current downlink time domain unit reaches the maximum, and if the amount of the scheduling signalings that have been detected on the current downlink time domain unit reaches the maximum amount, determining that the condition for stopping the scheduling signaling detection is satisfied.

The second determining sub-module 722 is configured to determine that the condition for stopping the scheduling signaling detection is satisfied, when the second detection indication information is detected on the current downlink time domain unit.

The third determining sub-module 723 is configured to determine that the condition for stopping the scheduling signaling detection is satisfied, when the third detection indication information is detected on the current downlink time domain unit, and currently remaining amount of the scheduling signalings to be detected indicated by the third detection indication information is zero.

The fourth determining sub-module 724 is configured to determine that the condition for stopping the scheduling signaling detection is satisfied, when the scheduling signalings are descrambled on the current downlink time domain unit, if the scheduling signalings are descrambled through the second preset scrambling sequence.

Figure 15:
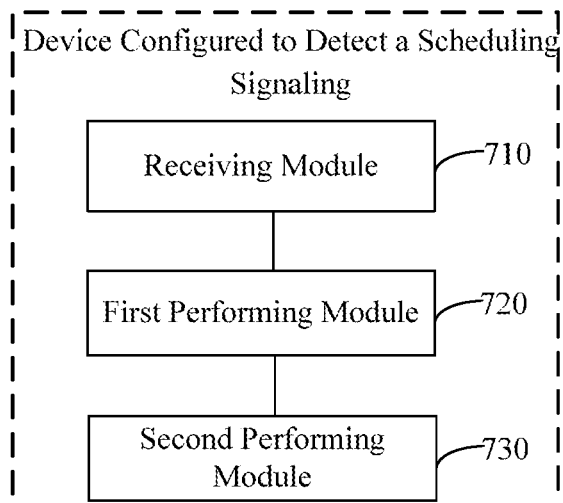
FIG. 15 is a block diagram illustrating another device for detecting a scheduling signaling according to an exemplary embodiment.

Referring to FIG. 15, which is a block diagram of another device for detecting a scheduling signaling on the basis of the embodiment illustrated in FIG. 13, the device further includes: a second performing module 730.

The second performing module 730 is configured to continue to perform the scheduling signaling detection on the current downlink time domain unit, if it is determined that the condition for stopping the scheduling signaling detection is not satisfied according to the target information, and the amount of the scheduling signaling detection on the current downlink time domain unit has not reached a preset maximum corresponding to the terminal.

For the device embodiment, since it substantially corresponds to the method embodiment, it can be referred to the description of the method embodiment. The device embodiments described above are merely illustrative, wherein the units described as separate components may or may not be physically separated, and the components displayed as units may or may not be physical units, that is, may be located in one place, or they can be distributed on the multiple network elements. Some or all of the modules may be selected according to actual needs to achieve the objectives of the present disclosure. One of ordinary skill in the art can understand and implement the method without any inventive work.

Correspondingly, the present disclosure further provides a computer readable storage medium, wherein the storage medium stores a computer program for executing any of the methods of detecting scheduling signalings on the base station side above.

Correspondingly, the present disclosure further provides a computer readable storage medium, wherein the storage medium stores a computer program for executing any of the methods of detecting scheduling signalings on the terminal side above.

Correspondingly, the present disclosure further provides a device for detecting a scheduling signaling, which is applicable to a base station, including:

a processor; and a memory for storing signaling executed by the processor; wherein the processor is configured to:

send target information to a terminal, wherein the target information is configured to determine whether a condition for stopping scheduling signaling detection on a current downlink time domain unit is satisfied, when the scheduling signaling detection is performed by the terminal on each downlink time domain unit.

Figure 16:
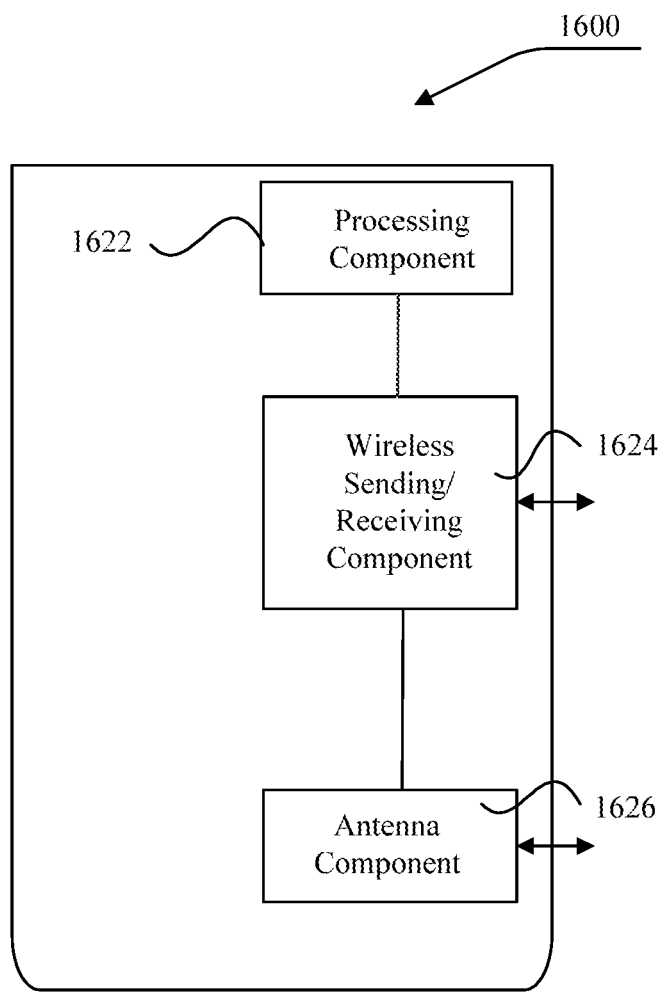
FIG. 16 is a schematic structural diagram illustrating a device for detecting a scheduling signaling according to an exemplary embodiment.

As illustrated in FIG. 16, FIG. 16 is a schematic structural diagram of a device 1600 configured to detect scheduling signalings according to an exemplary embodiment. The device 1600 can be provided as a base station. Referring to FIG. 16, the device 1600 includes a processing component 1622, a wireless sending/receiving component 1624, an antenna component 1626, and a signal processing portions specific to the wireless interface. The processing component 1622 can further include one or more processors.

One of the processing components 1622 can be configured to execute any of the methods of detecting scheduling signalings on the base station side above.

Correspondingly, the present disclosure further provides a device for detecting a scheduling signaling, which is applicable to a terminal, including:

a processor; and a memory for storing instructions executable for the processor;

wherein the processor is configured to:

receive target information sent by a base station; wherein the target information is configured to determine whether a condition for stopping scheduling signaling detection on a current downlink time domain unit is satisfied, when the scheduling signaling detection is performed on by the terminal each downlink time domain unit; and stop performing the scheduling signaling detection on the current downlink time domain unit if it is determined that the condition for stopping the scheduling signaling detection is satisfied according to the target information, when the scheduling signaling detection is performed on each downlink time domain unit.

Figure 17:
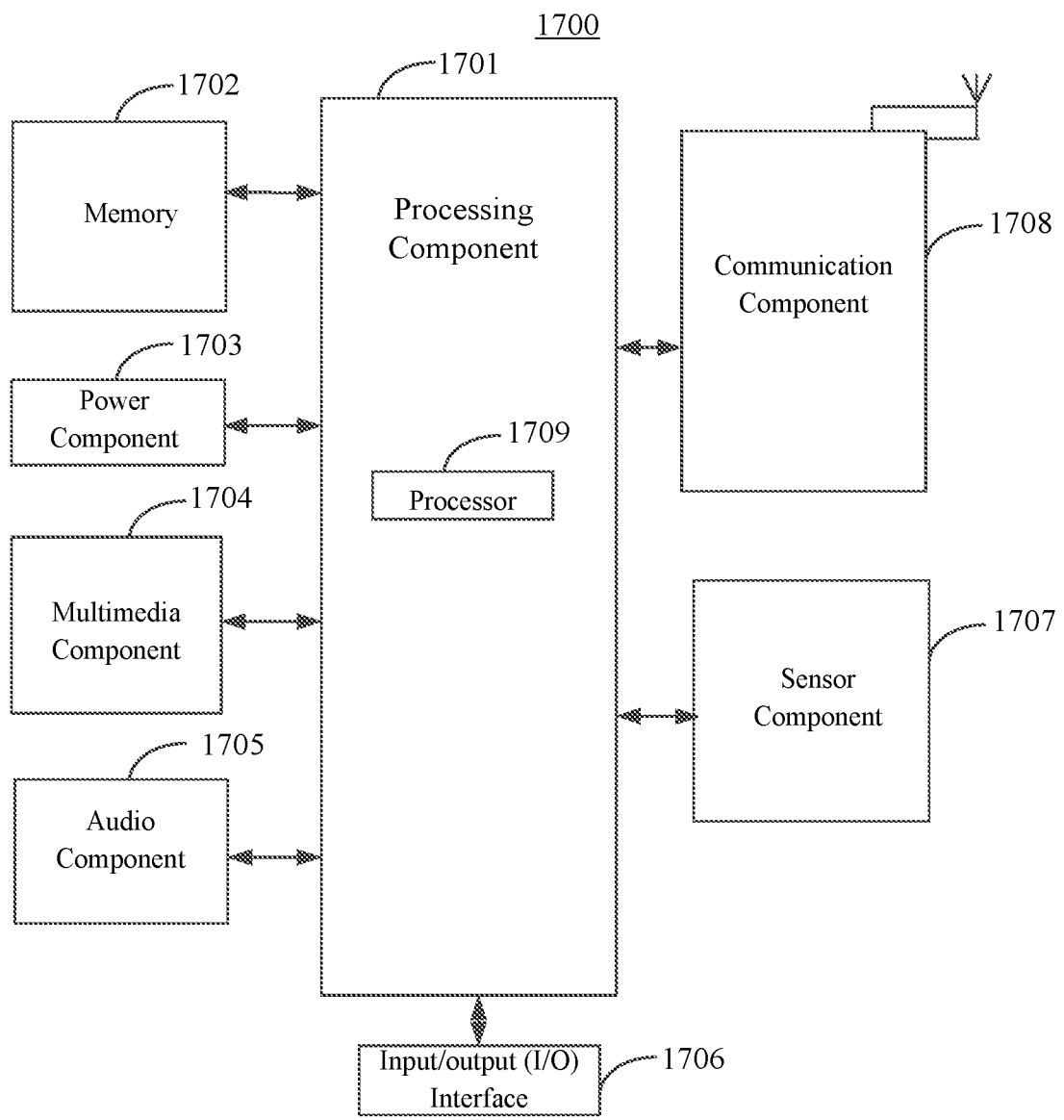
FIG. 17 is a schematic structural diagram illustrating another device for detecting a scheduling signaling according to an exemplary embodiment.

FIG. 17 is a schematic structural diagram of a device for detecting a scheduling signaling according to an exemplary embodiment. As illustrated in FIG. 17, the device 1700 configured to detect scheduling signalings illustrated according to an exemplary embodiment can be a terminal such as a computer, a mobile phone, a digital broadcast terminal, a messaging device, a game console, a tablet device, a medical device, a fitness device, a personal digital assistant, and the like.

Referring to FIG. 17, the device 1700 can include one or more of the following components: a processing component 1701, a memory 1702, a power component 1703, a multimedia component 1704, an audio component 1705, an input/output (I/O) interface 1706, a sensor component 1707, and a communication component 1708.

The processing component 1701 typically controls overall operations of the device 1700, such as operations associated with display, telephone calls, data communications, camera operations, and recording operations. The processing component 1701 can include one or more processors 1709 configured to execute instructions to perform all or part of the steps in the methods as described above. Moreover, the processing component 1701 can include one or more modules to facilitate the interaction between the processing component 1701 and other components. For example, the processing component 1701 can include a multimedia module to facilitate the interaction between the multimedia component 1704 and the processing component 1701.

The memory 1702 is configured to store various types of data to support operations of the device 1700. Examples of such data include instructions for any application or method operated on device 1700, such as contact data, phone book data, messages, pictures, videos, and the like. The memory 1702 can be implemented by any type of volatile or nonvolatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1703 supplies power to various components of the device 1700. The power component 1703 can include a power management system, one or more power sources, and other components associated with the generation, management, and distribution of power in the device 1700.

The multimedia component 1704 includes a screen providing an output interface between the device 1700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense duration and a pressure associated with the touch or swipe action. In some embodiments, the multimedia component 1704 includes a front camera and/or a rear camera. When the device 1700 is in an operation mode, such as a photographing mode or a video mode, the front camera and/or the rear camera can receive external multimedia data. Each of the front camera and the rear camera can be a fixed optical lens system or have focus and optical zoom capability.

The audio component 1705 is configured to output and/or input an audio signal. For example, the audio component 1705 includes a microphone (MIC) configured to receive an external audio signal when the device 1700 is in an operation mode, such as a call mode, a recording mode, and a voice recognition mode. The received audio signal may be further stored in the memory 1702 or sent via the communication component 1708. In some embodiments, the audio component 1705 further includes a speaker for outputting the audio signal.

The I/O interface 1706 provides an interface between the processing component 1701 and peripheral interface modules, such as a keyboard, a click wheel, buttons, and the like. These buttons may include, but are not limited to, a home button, a volume button, a starting button, and a locking button.

The sensor component 1707 includes one or more sensors configured to provide status assessments of various aspects of the device 1700. For example, the sensor component 1707 can detect an ON/OFF status of the device 1700, relative positioning of components, such as the display and the keypad of the device 1700. The sensor component 1707 can further detect a change in position of one component of the device 1700 or the device 1700, the presence or absence of user contact with the device 1700, an orientation, or an acceleration/deceleration of the device 1700, and a change in temperature of the device 1700. The sensor component 1707 can include a proximity sensor configured to detect the presence of nearby objects without any physical contact. The sensor component 1707 can further include a light sensor, such as a CMOS or CCD image sensor, configured to use in imaging applications. In some embodiments, the sensor component 1707 can further include an accelerometer sensor, a gyroscope sensor, a magnetic sensor, a pressure sensor, or a temperature sensor.

The communication component 1708 is configured to facilitate wired or wireless communication between the device 1700 and other devices. The device 1700 can access a wireless network based on a communication standard, such as Wi-Fi, 2G or 3G, or a combination thereof. In an exemplary embodiment, the communication component 1708 receives broadcast signals or broadcast associated information from an external broadcast management system via a broadcast channel. In an exemplary embodiment, the communication component 1708 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 1700 can be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In an exemplary embodiment, there is further provided a non-transitory computer-readable storage medium including instructions, such as a memory 1702 including instructions executable by the processor 1709 of the device 1700 to perform the method as described above. For example, the non-transitory computer-readable storage medium can be a ROM, a random-access memory (RAM), a CD-ROM, a magnetic tape, a floppy disc, and an optical data storage device.

wherein, when the instructions in the storage medium are executed by the processor, the device 1700 is enabled to perform any of the methods of detecting scheduling signalings on the terminal side as described above.

Other embodiments of the present disclosure will be apparent to one of ordinary skill in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is set forth by the appended claims.

It should be understood that the present disclosure is not limited to the exact structures that have been described above and illustrated in the drawings, and various modifications and changes can be made without departing from the scope thereof. The scope of the present disclosure is set forth only by the appended claims.

The invention claimed is:

1. A method for detecting a scheduling signaling, performed by a base station, and the method comprising:
 sending first information through Radio Resource Control (RRC) signaling to a terminal, wherein the first information characterizes whether a condition for stopping scheduling signaling detection on a current downlink time domain unit is satisfied, and when the scheduling signaling detection is performed by the terminal on each downlink time domain unit, the RRC signaling is sent before the scheduling signaling;
 wherein the first information comprises
 a maximum of amount of scheduling signalings transmitted on each downlink time domain unit; and
 wherein the condition for stopping scheduling signaling detection comprises a number of the scheduling signaling that have been detected on the current downlink time domain reaching the maximum.

2. The method of claim 1, wherein the first information further comprises detection indication information, and wherein the detection indication information comprises:
 a first detection indication information configured to indicate continuing the scheduling signaling detection, and a second detection indication information configured to indicate stopping the scheduling signaling detection; or
 a third detection indication information configured to indicate currently remaining amount of the scheduling signaling to be detected.

3. The method of claim 1, wherein the first information is located at a preset position of the scheduling signaling, and the first information has a preset length.

4. The method of claim 1, wherein the first information further comprises feature information, and when the first information comprises the feature information, the sending first information to the terminal through Radio Resource Control (RRC) signaling comprises:
 after scrambling the scheduling signaling through the first information, sending scrambled scheduling signaling to the terminal.

5. A communication system implementing the method of claim 1, comprising the base station and the terminal,
 wherein the base station is configured to:
 send the first information through Radio Resource Control (RRC) signaling to the terminal, and upon the terminal performing the scheduling signaling detection on each downlink time domain unit, it is determined whether the condition for stopping the scheduling signaling detection on the current downlink time domain unit is satisfied; and
 wherein the terminal is configured to:
 stop performing the scheduling signaling detection on the current downlink time domain unit upon the condition for stopping scheduling signaling detection is satisfied to thereby realize a dynamic scheduling process, avoid unnecessary scheduling signaling detection, reduce detection complexity and power consumption of the terminal.

6. The system of claim 5, wherein:
 the first information further includes detection indication information and the detection indication information including a first detection indication information configured to indicate continuing the scheduling signaling detection, a second detection indication information configured to indicate stopping the scheduling signaling detection; and a third detection indication information configured to indicate a currently remaining amount of scheduling signalings to be detected;
 the base station is configured to send the scheduling signaling carrying the first information to the terminal; and
 upon the terminal detecting the second detection indication information, or detecting the third detection indication information and the currently remaining amount of the scheduling signalings to be detected indicated by the third detection indication information is zero, it is determined that the condition for stopping the scheduling signaling detection is satisfied.

7. The system of claim 5, wherein the first information further comprises feature information configured to characterize whether to stop the scheduling signaling detection, wherein the feature information comprises:
 a first preset scrambling sequence and a second preset scrambling sequence for scrambling downlink control information;

wherein, the first preset scrambling sequence is configured to indicate that the scheduling signaling detection is continued, and the second preset scrambling sequence is configured to indicate that the scheduling signaling detection is stopped.

8. A method for detecting a scheduling signaling, performed by a terminal, and the method comprising:

receiving first information sent by a base station through Radio Resource Control (RRC); wherein the first information characterizes whether a condition under which scheduling signaling detection on a current downlink time domain unit is stopped is satisfied, when the scheduling signaling detection is performed on each downlink time domain unit by the terminal, the RRC signaling is sent before the scheduling signaling; and when the scheduling signaling detection is performed on each downlink time domain unit, if it is determined that the condition under which the scheduling signaling detection is stopped is satisfied according to the first information, stopping the scheduling signaling detection on the current downlink time domain unit, wherein the first information comprises a maximum of amount of scheduling signalings transmitted on each downlink time domain unit;

the condition for stopping scheduling signaling detection comprises a number of the scheduling signaling that have been detected on the current downlink time domain reaching the maximum.

9. The method of claim 8, wherein the first information further comprises detection indication information, and wherein the detection indication information is configured to indicate whether to stop the scheduling signaling detection, wherein the detection indication information comprises:

a first detection indication information configured to indicate continuing the scheduling signaling detection, and a second detection indication information configured to indicate stopping the scheduling signaling detection; or a third detection indication information configured to indicate a number of the scheduling signaling currently remaining that need to be detected.

10. The method according to claim 8, wherein the determining that the condition under which the scheduling signaling detection is stopped is satisfied according to the first information comprises any one of the following:

determining whether a number of scheduling signalings that have been detected on the current downlink time domain unit reaches the maximum, and if the number of the scheduling signaling that have been detected on the current downlink time domain unit reaches the maximum, determining that the condition under which the scheduling signaling detection is stopped is satisfied;

when the second detection indication information is detected on the current downlink time domain unit, determining that the condition under which the scheduling signaling detection is stopped is satisfied;

when the third detection indication information is detected on the current downlink time domain unit, and the number of the scheduling signalings currently remaining that need to be detected indicated by the third detection indication information is zero, determining that the condition under which the scheduling signaling detection is stopped is satisfied; and when the scheduling signaling is descrambled on the current downlink time domain unit, and if the scheduling signaling is descrambled by the second preset scrambling sequence, determining that the condition under which the scheduling signaling detection is stopped is satisfied.

11. The method of claim 8, wherein the method further comprises:

if it is determined that the condition under which the scheduling signaling detection is stopped is not satisfied according to the first information, and the number of times of the scheduling signaling detection on the current downlink time domain has not reached a preset maximum times corresponding to the terminal, the scheduling signaling detection on the current downlink time domain unit continues.

12. The method of claim 8, wherein the first information further comprises feature information configured to characterize whether to stop the scheduling signaling detection, wherein the feature information comprises:

a first preset scrambling sequence and a second preset scrambling sequence for scrambling downlink control information;

wherein, the first preset scrambling sequence is configured to indicate that the scheduling signaling detection is continued, and the second preset scrambling sequence is configured to indicate that the scheduling signaling detection is stopped.

13. A device for detecting a scheduling signaling, which is applicable to a base station, the device comprising:

a processor; and a memory for storing instructions executable by the processor;

wherein the processor is configured to:

send first information to a terminal through Radio Resource Control (RRC) signaling, wherein the first information is configured to determine characterizes whether a condition for stopping scheduling signaling detection on a current downlink time domain unit is satisfied, when the scheduling signaling detection is performed by the terminal on each downlink time domain unit, the RRC signaling is sent before the scheduling signaling, wherein the first information comprises a maximum of amount of scheduling signalings transmitted on each downlink time domain unit;

the condition for stopping scheduling signaling detection comprises a number of the scheduling signaling that have been detected on the current downlink time domain reaching the maximum.

14. The device of claim 13, wherein the detection indication information comprises:

a first detection indication information configured to indicate continuing the scheduling signaling detection, and a second detection indication information configured to indicate stopping the scheduling signaling detection; or a third detection indication information configured to indicate currently remaining amount of the scheduling signaling to be detected;

wherein the first information is located at a preset position of the scheduling signaling, and the first information has a preset length;

wherein the processor is further configured to:

send a scrambled scheduling signaling to the terminal, after the scheduling signaling is scrambled by the first information.

15. A device for detecting a scheduling signaling, wherein the device is applicable to a terminal, and comprises:
- a processor; and
- a memory for storing instructions executable by the processor;
- wherein the processor is configured to:
- receive first information sent by a base station through Radio Resource Control (RRC); wherein the first information characterizes whether a condition for stopping scheduling signaling detection on a current downlink time domain unit is satisfied, when the scheduling signaling detection is performed by the terminal on each downlink time domain unit, the RRC signaling is sent before the scheduling signaling; and
- when the scheduling signaling detection is performed on each downlink time domain unit, if it is determined that the condition for stopping the scheduling signaling detection is satisfied according to the first information, stop the scheduling signaling detection on the current downlink time domain unit,
- wherein the first information comprises
- a maximum of amount of scheduling signalings transmitted on each downlink time domain unit;
- the condition for stopping scheduling signaling detection comprises a number of the scheduling signaling that have been detected on the current downlink time domain reaching the maximum.

\* \* \* \* \*